(12) United States Patent
Agrawal et al.

(10) Patent No.: US 12,342,096 B2
(45) Date of Patent: Jun. 24, 2025

(54) AGGREGATING SHARED IMAGE/VIDEO CONTENT FOR CLOUD BACKUP

(71) Applicant: MOTOROLA MOBILITY LLC, Wilmington, DE (US)

(72) Inventors: Amit Kumar Agrawal, Bangalore (IN); Renuka Prasad Herur Rajashekaraiah, Bangalore (IN); Rahul Bharat Desai, Hoffman Estates, IL (US); Srikanth Raju, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 290 days.

(21) Appl. No.: 18/149,141

(22) Filed: Jan. 2, 2023

(65) Prior Publication Data

US 2024/0223721 A1 Jul. 4, 2024

(51) Int. Cl.
| | |
|---|---|
| *H04N 5/77* | (2006.01) |
| *G06F 3/04842* | (2022.01) |
| *G06T 7/00* | (2017.01) |
| *G06V 20/30* | (2022.01) |
| *G06V 40/16* | (2022.01) |
| *H04L 67/561* | (2022.01) |
| *H04L 67/568* | (2022.01) |

(52) U.S. Cl.
CPC ............. *H04N 5/77* (2013.01); *G06T 7/0002* (2013.01); *G06V 20/30* (2022.01); *G06V 40/172* (2022.01); *H04L 67/561* (2022.05); *H04L 67/568* (2022.05); *G06F 3/04842* (2013.01); *G06T 2207/30168* (2013.01)

(58) Field of Classification Search
CPC ....... G06F 3/04842; G06T 2207/20081; G06T 2207/20084; G06T 2207/30168; G06T 7/0002; G06V 20/30; G06V 40/172; H04L 67/561; H04L 67/568; H04N 5/77
See application file for complete search history.

(56) References Cited

U.S. PATENT DOCUMENTS

| | | | |
|---|---|---|---|
| 10,057,651 B1 | 8/2018 | Singh | |
| 2007/0236505 A1* | 10/2007 | Jung | .................. H04N 1/00137 345/589 |
| 2011/0143811 A1* | 6/2011 | Rodriguez | ......... H04N 1/00244 455/556.1 |

(Continued)

*Primary Examiner* — Amy R Hsu
(74) *Attorney, Agent, or Firm* — Isidore PLLC

(57) ABSTRACT

An electronic device, method, and computer program product optimize automatic backups by aggregating remotely generated media content for automatic backup. The electronic device receives, from image capturing device(s), local media content including image(s) and/or video(s). The electronic device performs content recognition to identify local object(s) contained in the local media content. The electronic device monitors execution of a media application that accesses remote media content and performs content recognition to identify object(s) contained in the remote media content. In response to determining that remote media content contains object(s) that is also identified in the local media content, stores the remote media content in a data structure in memory. The electronic device uploads, via a communication network to a network storage service, all media content stored in the data structure.

20 Claims, 9 Drawing Sheets

(56) References Cited

U.S. PATENT DOCUMENTS

| | | | |
|---|---|---|---|
| 2014/0080428 A1* | 3/2014 | Rhoads | H04W 4/70 |
| | | | 455/88 |
| 2014/0195921 A1* | 7/2014 | Grosz | G06Q 30/0631 |
| | | | 715/738 |
| 2014/0351709 A1* | 11/2014 | Uno | G06F 3/04842 |
| | | | 715/747 |
| 2019/0268536 A1 | 8/2019 | Han | |
| 2019/0286892 A1* | 9/2019 | Li | G06T 7/70 |
| 2023/0005224 A1* | 1/2023 | Cudak | G10L 15/22 |
| 2023/0082050 A1* | 3/2023 | Li | G06T 11/001 |

\* cited by examiner

_(1)_
AGGREGATING SHARED IMAGE/VIDEO CONTENT FOR CLOUD BACKUP

CROSS REFERENCE TO RELATED APPLICATIONS

The present application is related to commonly owned U.S. patent application filed on even date herewith to the same named inventors and entitled "Pre-Filtering Locally Stored Image/Video Content for Cloud Backup" Ser. No. 18/149,138, the disclosure of which is hereby incorporated by reference in its entirety.

BACKGROUND

1. Technical Field

The present disclosure relates generally to electronic devices that store media content, and in particular to electronic devices that backup local media content in cloud storage.

2. Description of the Related Art

Capturing high resolution digital photography has become ubiquitous with personal electronic devices, including digital cameras, smart phones, etc. Cloud backup services are often used to automatically backup the digital media content to prevent inadvertent loss. In the past, users of digital video cameras downloaded media content of digital images and digital video recordings to a user device such as laptop or desktop computer for editing, local storage, and viewing. Recently, digital cameras incorporated into mobile user devices such as smartphones have increased in performance to favorably compete with dedicated cameras. Users tend to always have a smartphone available, enabling the taking of an increased number of high resolution images and videos, which require lots of on-device storage space.

Instead of being selective in taking pictures to avoid film development costs, users of digital cameras take multiple pictures of the same scene to increase the likelihood of getting a good image. When taking a video, a user tends to activate the camera early to be sure to catch the start of an event and tends to be slow to deactivate the camera, increasing the resulting size of the video recording. Digital images of high resolution require megabytes of storage, and the storage requirement for videos are orders of magnitude more. Although the size of on-device digital memory has increased, with a reduction in the cost of the larger memory, users often rely on available cloud storage to provide sufficient storage for the large amount of digital content. Cloud storage services may extend a small amount of free cloud storage space to new users to secure market share, but then require subscriptions to increase storage size to handle the large amounts of stored content. Although the need to preserve personal media content remains, cloud backup of personal media content needs optimization to avoid the expense of storing low quality media content.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
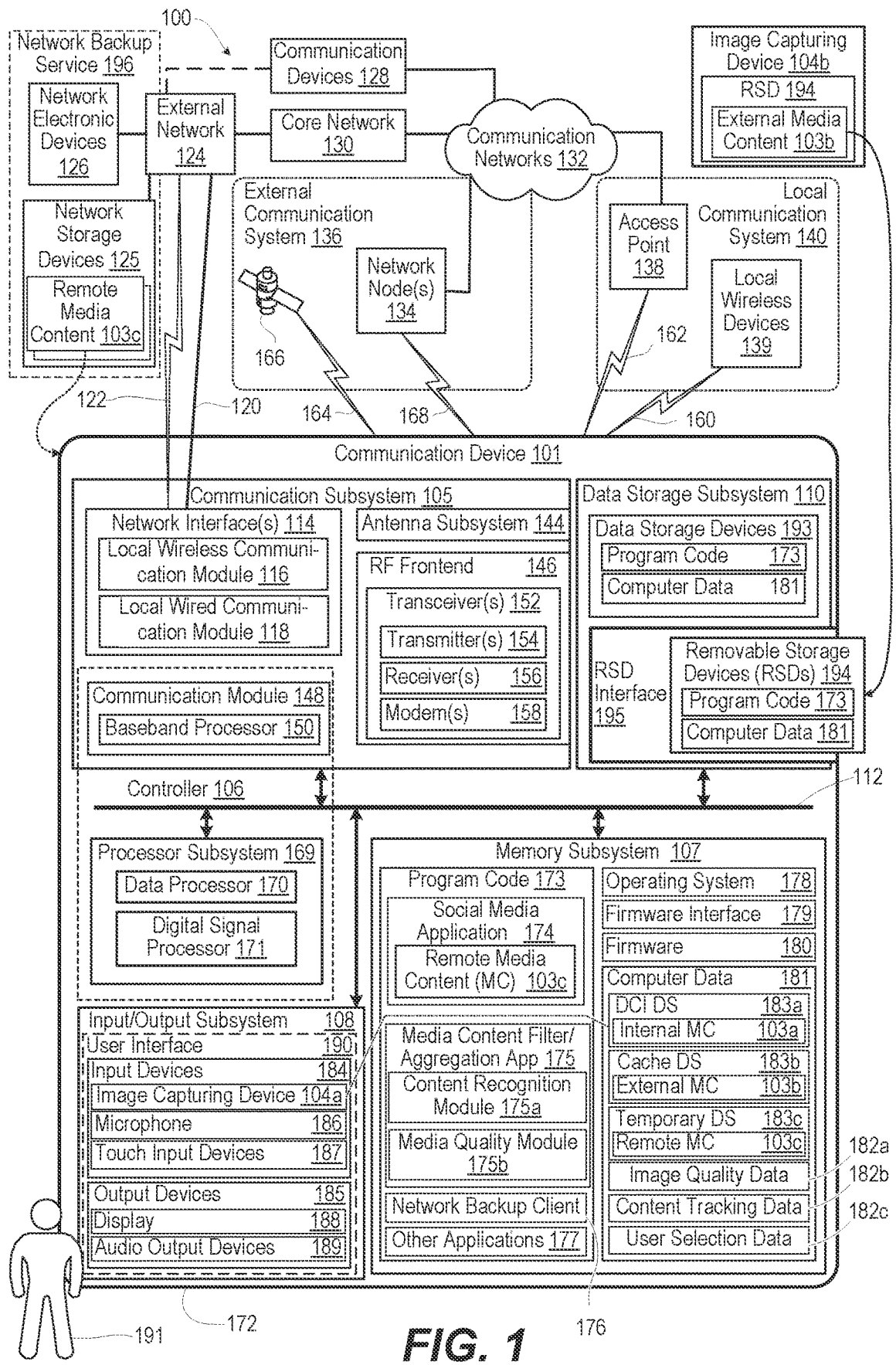
FIG. 1 depicts a functional block diagram of a communication environment including a communication device that aggregates and filters media content for automatic network storage backup, according to one or more embodiments.

According to a first aspect of the present disclosure, an electronic device, a method and a computer program product optimize automatic backups of media content by aggregating remotely generated media content for automatic backup. Remote media content that is appropriate for aggregating is determined by recognizing content, such as faces, which is also found in the locally generated media content that is being backed up. In one or more embodiments, the content that is recognized may be animals, robots, buildings, etc. Although increasing network storage requirements, the automatic aggregation enables capture and storage in one place of personal media content that may not otherwise be backed up. In one or more embodiments, the electronic device includes at least one ICD that generates local media content comprising at least one image or video. The electronic device includes a memory that stores a client cloud storage application, a media application that accesses remote media content including at least one image or video, a content recognition module, and a digital camera image data structure. The electronic device includes a communication subsystem communicatively connectable to a communication network. A controller is communicatively connected to the at least one image capturing device, the memory, and the communication subsystem. The controller receives the local media content from the at least one image capturing device. In an example, the local media content is captured using at least one local image capturing device and stored in a local data structure that is automatically backed up, which indicates designation of unique content (e.g., faces) of the backed up media content as being of of interest or value. In another example, importing external media content from an external image capturing device to a local data structure that is automatically backed up indicates designation of unique content (e.g., faces) of the backed up media content as being of interest or value. The controller performs content (e.g., facial) recognition, using the content recognition module, to identify content (e.g., one or more local faces) contained in the local media content. The controller executes the media application to access, via the communication subsystem, the remote media content such as from a social media service. Merely browsing remote media content such as social media content does not indicate all by itself that the remote media content is of interest or value to a user sufficient for automatic backup. The controller performs facial recognition on the remote media content to identify one or more faces contained in the remote media content. In response to determining that remote media content contains the content (e.g., at least one face) that is also identified in the local media content, the controller stores a copy of the remote media content in the digital camera image data structure. The controller executes the client cloud storage application to upload, via the communication subsystem and the communication network to a network storage service, media content stored in the digital camera image data structure.

In one or more embodiments, the electronic device optimizes automatic network backup of media content by identifying and aggregating remote content that would otherwise not be locally saved and backed up. The identified candidates from remote media content are likely of value as being similar to locally generated media content that is backed up. Many different ICDs may capture images or videos of the same subjects captured by a local ICD. These other images or videos ("remote media content") may be posted on social media or shared via messaging with a user for viewing on the electronic device. To the extent that the electronic device may locally store the remote media content, the storage may tend to be in temporary data structures controlled by other applications that are not included in automatic network backup. Rather than requiring a tedious and inconvenient manual process by a user to individually capture the remote media content, the electronic device, according to aspects of the present disclosure, identifies and aggregates the remote media content that is recognized by facial recognition to be associated with content of interest within captured local media content.

In an example, the electronic device may periodically scan storage locations used by social media to locate remote media content stored on the electronic device. Using a face recognition algorithm, the electronic device determines which photos are of the user or user's close family/friends/pets (or specific content of particular interest to the user based on the user's image capturing patterns or online download patterns) and suggests keeping only such photos in the user's directory structure for backup. This algorithm would detect high occurrences of similar faces and assume that these faces are the relevant ones, rather than requiring the user to specifically identify which faces are important. For other photos that are not as relevant to the user, the electronic device may prompt the user to share such content directly with other users and/or delete them from the local directory structure. This would cover the use case of attending an event, such as a wedding, and taking photos or videos of other people with the ultimate goal of sharing such content with them.

According to a second aspect of the present disclosure, an electronic device, a method and a computer program product optimize automatic backup of locally stored media content such as videos and images. The electronic device identifies and locally caches low quality media content rather than automatically backing up that content, in order to reduce network storage requirement. The media content may be locally generated or imported to local storage. In one or more embodiments, an electronic device includes at least one image capturing device (ICD) that generates media content, including at least one of images and videos. The electronic device includes a memory that stores a client cloud storage application, a media analysis module, a cache data structure, and a digital camera image data structure. The electronic device includes a communication subsystem communicatively connectable to a communication network. A controller of the electronic device is communicatively connected to the ICD, the memory, and the communication subsystem. The controller receives the media content from the at least one image capturing device. The controller determines, by the media analysis module, a quality value of the media content. The controller stores the media content in the cache data structure. The controller stores, in the digital camera image data structure, at least a portion of the media content having a quality value that is greater than or equal to a minimum quality threshold level. The controller executes the client cloud storage application to upload, via the communication subsystem and the communication network to a network storage service, the portion of the media content stored in the digital camera image data structure.

In one or more embodiments, the electronic device optimizes network backup to support backup of only quality media content by intercepting media content prior or subsequent to the media content being placed in a data structure that queues content for automatic back up. As one aspect, the device performs filtering to reduce duplicates and redundant media content. In an example, multiple images captured in close succession may be filtered to select the best image, based on quality (e.g., focus, lighting, centering of a subject, lack of blur, etc.). As another aspect, video quality may be improved prior to storing for backup by trimming beginning or ending segments that are of low quality or provide low value information content. According to one embodiment, media content that is not selected for backup may be retained for a period of time or until user-initiated selection or purging.

In an example, the electronic device may periodically scan storage locations used by ICDs to store internal or external media content on the electronic device. Using an artificial intelligence (AI)-based algorithm, the electronic device may cluster sequentially captured photos together and determine which ones can potentially be considered superior quality photos. For example, photos that are blurry, not level with the horizon, too noisy, too dark, duplicate, etc. can be eliminated from the clustering. The AI-based algorithm then provides the user an option to keep or remove candidate "good" photos and learns the user preferences over time using an on-device deep learning algorithm. For example, if the user consistently does not keep brighter photos, the AI-based algorithm would offer darker photos as the "good" photo.

In the following detailed description of exemplary embodiments of the disclosure, specific exemplary embodiments in which the various aspects of the disclosure may be practiced are described in sufficient detail to enable those skilled in the art to utilize the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of communication environment 100 that includes an electronic device in which the features of the present disclosure are advantageously implemented. In particular, communication device 101 is an example of the electronic device that aggregates and filters media content for optimized automatic network storage backup, such as via a cloud service. Media content may include local media content 103a of digital images or digital video that is generated by local image capturing device (ICD) 104a of communication device 101. Media content includes external media content 103b that is imported to communication device 101 from external ICD 104b. In an example, external ICD 104b is a separate/standalone digital camera or digital video camera that is dedicated to capturing images and videos. Media content may include remote media content 103c that is retrieved by communication device 101. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. Communication device 101 includes communication subsystem 105, controller 106, memory subsystem 107, input/output (I/O) subsystem 108, and data storage subsystem 110 that are each managed by controller 106. System interlink 112 communicatively connects controller 106 with communications subsystem 107, memory subsystem 107, input/output subsystem 108, and data storage subsystem 110. System interlink 112 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 112 are illustrated in FIG. 1, it is to be understood that more, fewer, or different interconnections may be present in other embodiments.

In one or more embodiments, communications subsystem 107 may include one or more network interfaces 114 such as local wireless communication module 116 and local wired communication module 118 to communicatively couple via network cable 120 or wireless connection 122 to external networks 124. Communication device 101, via external networks 124, may connect to network storage devices 125 that store remote media content 103c and to network electronic devices 126, such as network servers, that facilitate access to network storage device 125. In an example, network electronic devices 126 can provide social media services and cloud backup services. Communication device 101 may communicate with second communication devices 128 via external network 124 or via communication networks 132 that are supported by core networks 130. Network interface(s) 114 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 107 may include additional functionality for communicating, using a cellular connection, with network node(s) 134 of external communication system 136 and for communicating, using a wireless connection, with wireless access point 138 or local wireless devices 139 of local communication system 140. Communications subsystem 107 includes antenna subsystem 144. Communications subsystem 107 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 106 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, controller 106, via communications subsystem 107, performs multiple types of cellular over-the-air (OTA) or wireless communication with local communication system 140. Communications subsystem 107 can communicate via an OTA connection 160 with local wireless devices 139. In an example, OTA connection 160 is a Bluetooth connection, or other personal access network (PAN) connection. In one or more embodiments, communications subsystem 107 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 107 receives downlink channels 164 from GPS satellites 166 to obtain geospatial location information. Communications subsystem 107 can communicate via an over-the-air (OTA) cellular connection 168 with network node(s) 134.

Controller 106 includes processor subsystem 169, which includes one or more central processing units (CPUs), depicted as data processor 170. Processor subsystem 169 can include one or more digital signal processors 171 that can be integrated with data processor 170. Processor subsystem 169 can include other processors that are communicatively coupled to data processor 170, such as baseband processors 150 of communication module 148. In one or embodiments that are not depicted, controller 106 can further include distributed processing and control components that are external to housing 172 or grouped with other components, such as I/O subsystem 108. Data processor 170 is communicatively coupled, via a system interlink 112, to memory subsystem 107. In one or more embodiments, data processor 170 is communicatively coupled via system interlink 112 to communication subsystem 105, I/O subsystem 108, and data storage subsystem 110. Controller 106 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 107 stores program code 173 for execution by processor subsystem 169 to provide the functionality described herein. Program code 173 includes applications such as social media application 174 that may present remote media content 103c, media content filter/aggregation (MCFA) application 175 having content recognition module 175a and media quality module 175b, network backup client 176, and other applications 177. In one or more embodiments, several of the described aspects of the present disclosure are provided via executable program code of applications executed by controller 106. In one or more embodiments, program code 173 may be integrated into a distinct chipset or hardware module as firmware that operates separately from executable program code. Portions of program code 173 may be incorporated into different hardware components that operate in a distributed or collaborative manner. Implementation of program code 173 may use any known mechanism or process for doing so using integrated hardware and/or software, as known by those skilled in the art. Memory subsystem 107 further includes operating system (OS) 178, firmware interface 179, such as basic input/output system (BIOS) or Uniform Extensible Firmware Interface (UEFI), and firmware 180.

Memory subsystem 107 stores computer data 181 generated and used by program code 173. In an example, computer data 181 includes media content 103a-103c, media quality data 182a, content tracking data 182b, and user selection data 182c generated and used by MCFA application 175. Program code 173 and computer data 181 may be organized in data structures (DS) 183a-183c within memory subsystem 107. In an example, digital camera image (DCI) DS 183a represents one or more folders that receive media content such as local media content 103a from internal ICD 104a. Network backup client 176 may be configured to automatically backup media content that is stored in DCI DS 183a to network storage devices 125. In another example, cache DS 183b according to aspects of the present disclosure is provided for intercepted media content, such as external media content 103b being imported from external ICD 104b, for evaluation for quality and other characteristics prior to selectively storing in DCI DS 183a. In an additional example, program code 173 such as social media application 174 may temporarily store computer data 181 such as remote media content 103c in temporary DS 183c to support presentation via input/output subsystem 108. Temporary DS 183 may not be a designated for automatic network backup, so any personal media content would be lost when the contents of temporary DS 183c are purged.

I/O subsystem 108 includes input devices 184 and output devices 185. Input devices 184 may include local ICD 104a, microphone 186, and touch input devices 187. Output devices 185 may include display 188 and audio output devices 189. Using capabilities of input devices 184 and output devices 185, user interface 190 is provided for user 191 to interact with program code 173.

Data storage subsystem 110 of communication device 101 includes data storage device(s) 193. Controller 106 is communicatively connected, via system interlink 112, to data storage device(s) 193. Data storage subsystem 110 provides program code 173 and computer data 181 stored on non-volatile storage that is accessible by controller 106. For example, data storage subsystem 110 can provide a selection of applications and computer data, such as MCFA application 175 and other application(s) 177. These applications can be loaded into memory subsystem 107 for execution by controller 106. In one or more embodiments, data storage device(s) 193 can include hard disk drives (HDDs), optical disk drives, and/or solid-state drives (SSDs), etc. Data storage subsystem 110 of communication device 101 can include removable storage device(s) (RSD(s)) 194, which is received in RSD interface 195. Controller 106 is communicatively connected to RSD 194, via system interlink 112 and RSD interface 195. In one or more embodiments, RSD 194 is a non-transitory computer program product or computer readable storage device. Controller 106 can access data storage device(s) 193 or RSD 194 to provision communication device 101 with program code 173 and computer data 181.

According to the first aspect of the present disclosure, controller 106 of communication device 101 receives media content 103*a*-103*b* from at least one image capturing device (ICD) 104*a*-104*b*. Controller 106 executes media quality module 175*b* of MCFA application 175 to configure communication device 101 to determine a quality value of the media content 103*a*-103*b*. Controller 106 stores media content 103*a*-103*b* in cache data structure (DS) 183*b*. Controller 106 stores, in DCI DS 183*a*, at least a portion of media content 103*a*-103*b* having a quality value that is greater than or equal to a minimum quality threshold level. Controller 106 executes a client cloud storage application, such as network backup client 176, to upload, via communication subsystem 105 and communication network 132 to network storage service 196, the portion of media content 103*a*-103*b* stored in DCI DS 183*a*. Network storage service 196 may include or utilize capabilities provided by network storage devices 125 and network electronic device 126.

According to the second aspect of the present disclosure, controller 106 of communication device 101 receives media content 103*a*-103*b* from at least one image capturing device (ICD) 104*a*-104*b*. Generation of images and storage, on communication device 101, of images originating at ICDs 104*a*-104*b* is presumed to be under the supervision of user 191. Choices in subjects captured in local and external media content 103*a*-103*b* indicates subjects that user 191 would store and backup if manually dispositioning remote media content 103*c*. Controller 106 executes content recognition module 175*b* of MCFA application 175 to configure communication device 101 to identify content contained in media content 103*a*-103*b*. In an example, content recognition module 175*b* may be configured to identify unique faces. Controller 106 executes social media application 174 to access remote media content 103*c*. Controller 106 executes content recognition module 175*a* to perform object recognition on remote media content 103*c* to identify content (e.g., one or more faces) contained in remote media content 103*c*. In response to determining that remote media content 103*c* contains the content (e.g., at least one face) that is also identified in local media content 103*a*, controller 106 stores, in DCI DS 183*a*, a copy of the images/video within remote media content 103*c*. Controller 106 executes a client cloud storage application such as network backup client 176 to upload, via communication subsystem 105 and communication network 132, to network storage service 196, the portion of remote media content 103*c* stored in DCI DS 183*a*. In one or more embodiments, communication device 101 may delete contents of DCI DS 183*a* once the content is uploaded to network storage service 196.

In one or more embodiments, behavior of MCFA application 175 may be customized. In an example, an enable/disable control may be presented to, or be accessible by, user 191 such as via user interface 190 to enable or disable MCFA application 175. MCFA application 175 may learn user preferences automatically. In one or more embodiments, user 191 may expressly input, via user interface 190, preferences such as acceptable or unacceptable quality preferences. User 191 may designate certain content (e.g., faces) as always save, save if the quality is good, or do not save.

Figure 2:
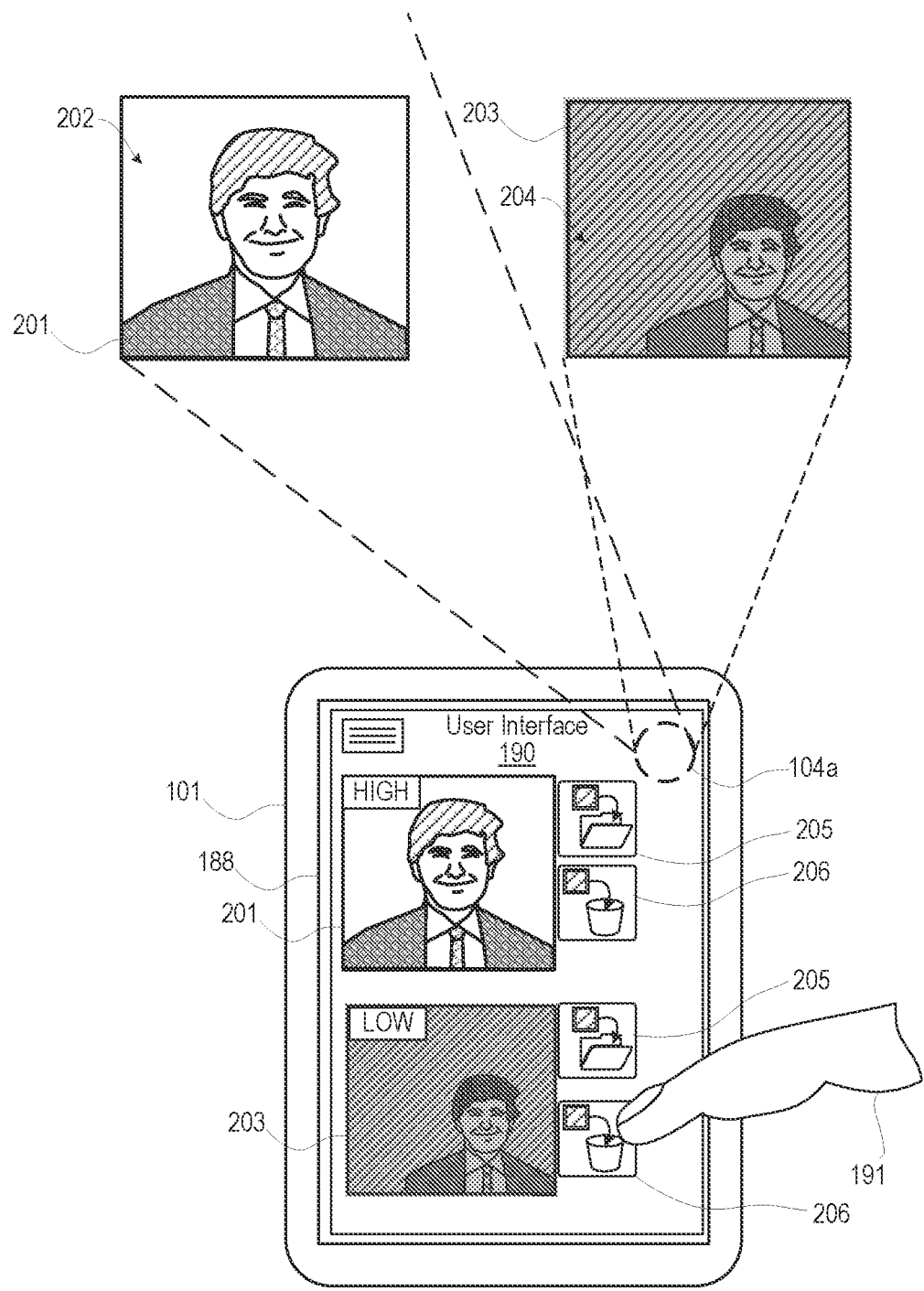
FIG. 2 depicts a front view of the communication device presenting, on a display, two images of differing quality and controls enabling inputs to filter each image, according to one or more embodiments.

FIG. 2 depicts a front view of communication device 101 presenting, on display 188, first image 201 that contains high-quality media content 202 and second image 203 that contains low-quality media content 204. In an example, images 201 and 203 may be taken in close succession by ICD 104*a*. In an example, electronic device 101 determines that first image 201 has quality above a threshold quality level based on one or more image characteristics such as brightness within an optimal range and a subject centered within first image 201. Electronic device 101 may also determine that second image 203 has quality below the threshold quality level based on one or more image characteristics such as brightness being outside of the optimal range and the subject off centered within second image 203. In one embodiment, user 191 can confirm or contradict the automatic quality determination by interacting with save control 205 and delete control 206 presented for each image 201 and 203 on user interface 190 on display 188.

Figure 3:
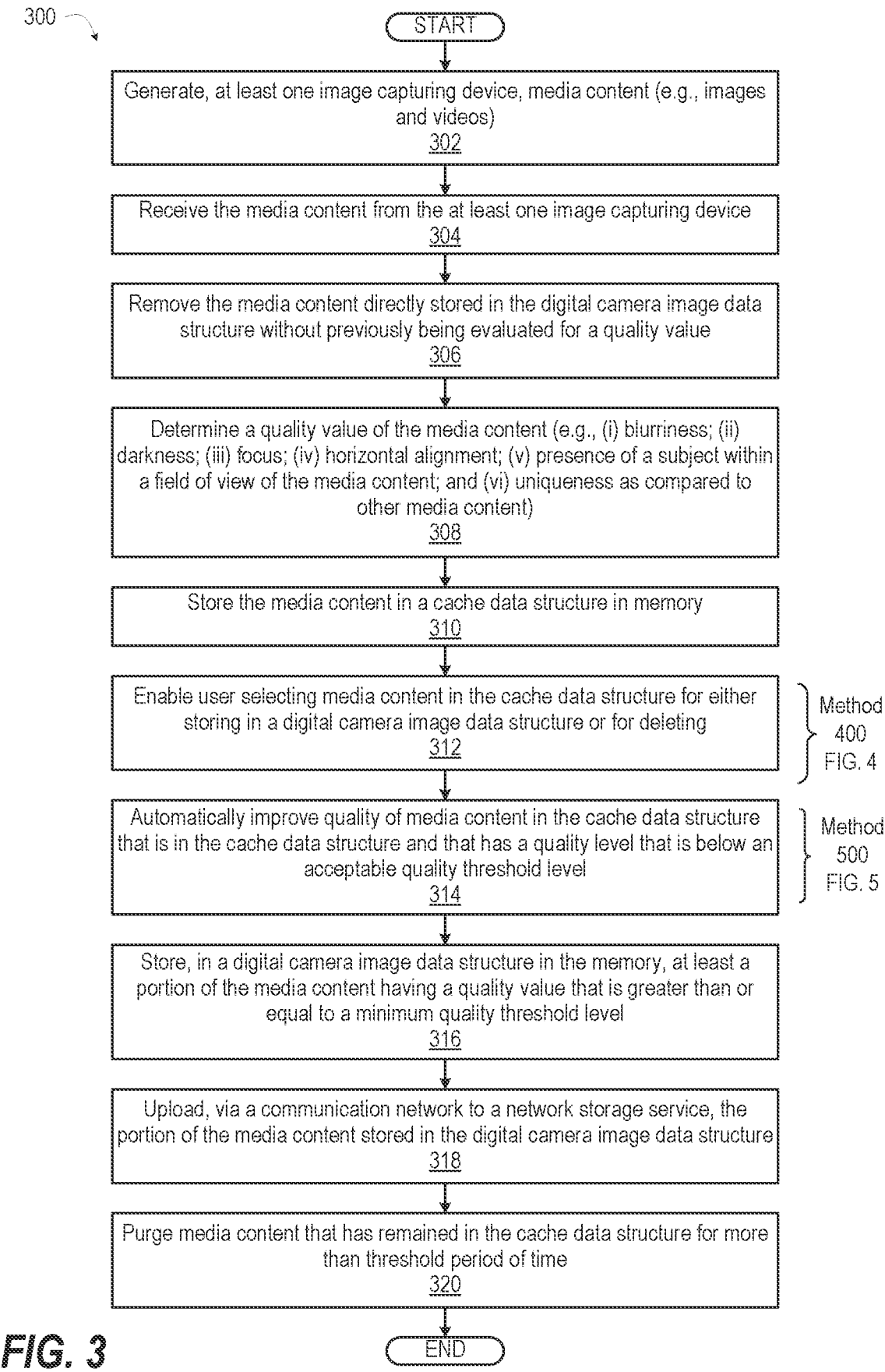
FIG. 3 depicts a flow diagram presenting an example method that automatically caches media content and filters the media content for automatic backup, based on quality, to reduce network storage requirements, according to one or more embodiments.
Figure 4:
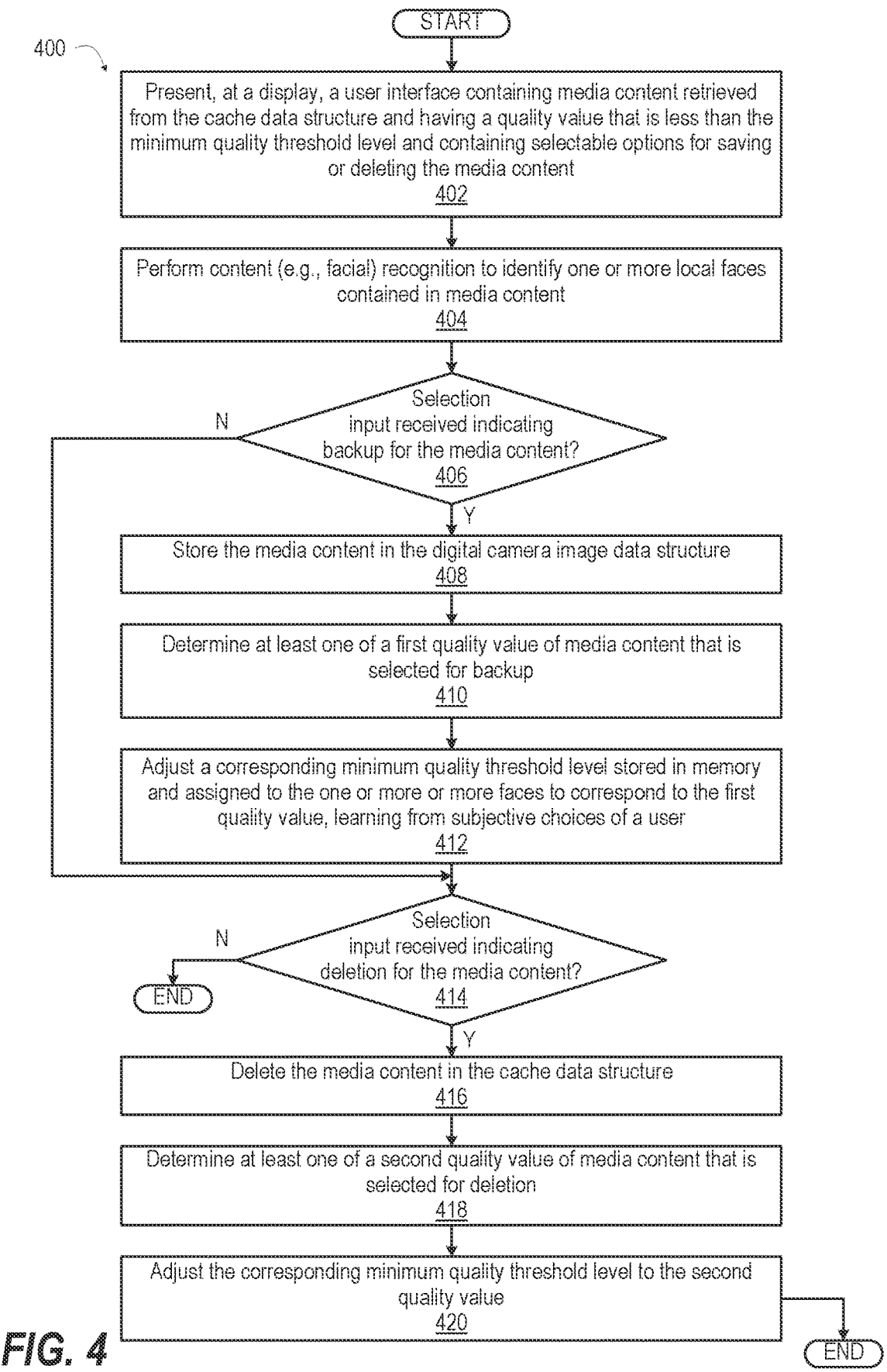
FIG. 4 depicts a flow diagram presenting an example method that implements a feature of FIG. 3 for enabling user confirmation of proposed filtering of media content, according to one or more embodiments.
Figure 5:
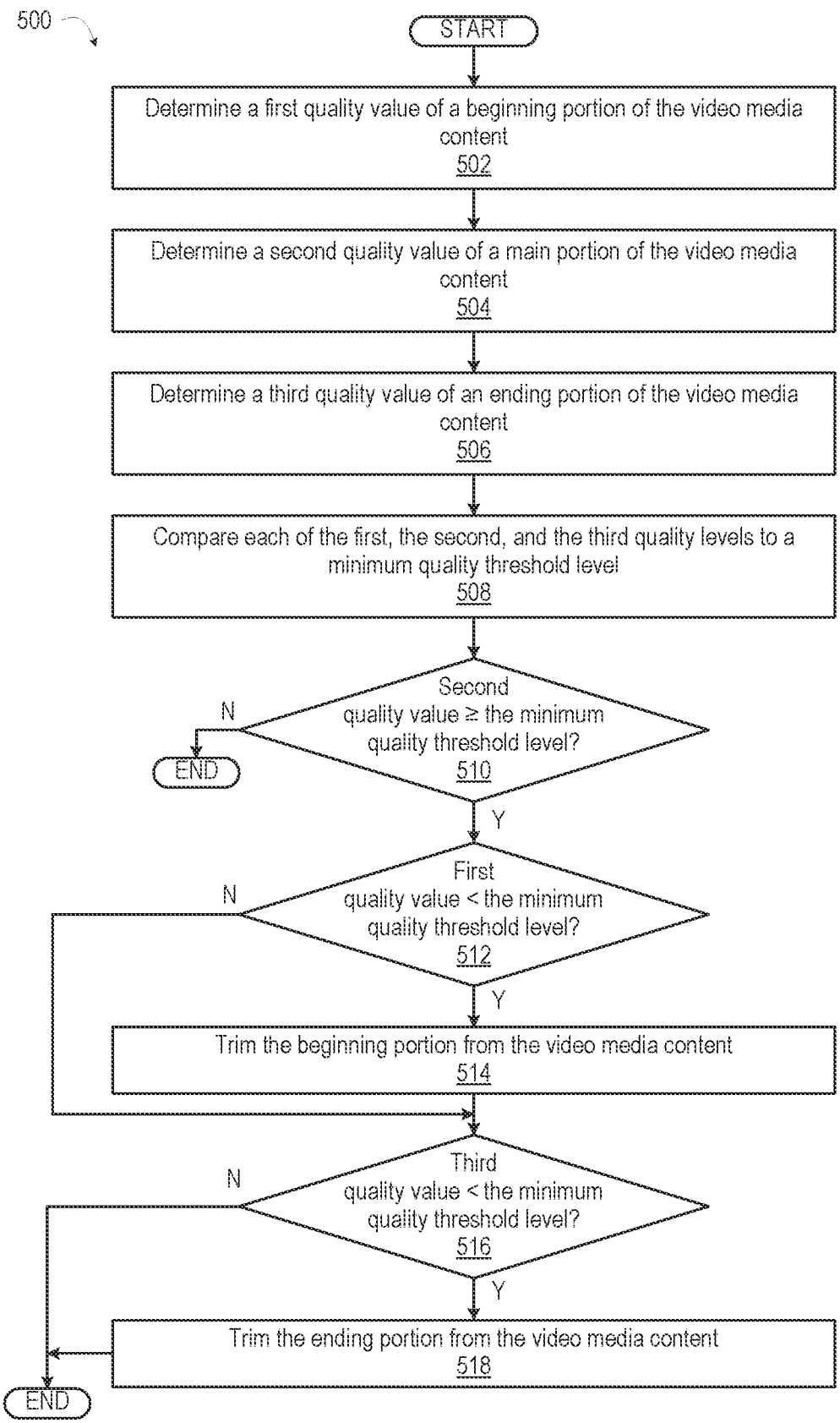
FIG. 5 depicts a flow diagram presenting an example method that implements a feature of FIG. 3 for automatically improving the quality of video media content prior to automatic backup, according to one or more embodiments.

FIG. 3 depicts a flow diagram presenting method 300 that automatically caches media content with filtering based on quality to reduce network storage requirement for automatic backup of media content. FIG. 4 depicts a flow diagram presenting method 400 that implements a feature of method 300 (FIG. 3) for enabling user confirmation of proposed filtering of media content. FIG. 5 depicts a flow diagram presenting method 500 that implements a feature of method 300 (FIG. 3) for automatically improving the quality of video media content prior to automatic backup. The descriptions of method 300 (FIG. 3), 400 (FIG. 4) and method 500 (FIG. 5) are provided with general reference to the specific components illustrated within the preceding FIGS. 1-2. Specific components referenced in method 300 (FIG. 3), 400 (FIG. 4) and method 500 (FIG. 5) may be identical or similar to components of the same name used in describing preceding FIGS. 1-2. In one or more embodiments, controller 106 (FIG. 1) configures communication device 101 (FIGS. 1-2) to provide the described functionality of method 300 (FIG. 3), 400 (FIG. 4) and method 500 (FIG. 5).

With reference to FIG. 3, method 300 includes generating, using at least one image capturing device, media content (e.g., images and videos) (block 302). Method 300 includes receiving the media content from the at least one image capturing device and storing the received media content in a digital camera image data structure (block 304). In one or more embodiments, method 300 includes removing the media content stored in the digital camera image data structure (block 306). Method 300 includes determining a quality value of the media content (e.g., (i) blurriness; (ii) darkness; (iii) focus; (iv) horizontal alignment; (v) presence of a subject within a field of view presented by the media content; and (vi) uniqueness as compared to other media content) (block 308). Method 300 includes storing the media content in a cache data structure in memory (block 310). In one or more embodiments, method 300 includes enabling user selecting of media content in the cache data structure for either storing in a digital camera image data structure or for deleting (block 312). An example of implementing block 312 is provided below in method 400 (FIG. 4). With continued reference to FIG. 3, in one or more embodiments, method 300 includes automatically improving quality of media content that is in the cache data structure and that has a quality level that is below an acceptable quality threshold level (block 314). An example of implementing block 314 is provided below in method 500 (FIG. 5). With continued reference to FIG. 3, method 300 includes storing, in a digital camera image data structure in the memory, at least a portion of the media content having a quality value that is greater than or equal to a minimum quality threshold level (block 316). In an example, the digital camera image data structure may be a folder in which import utilities directly store digital pictures and videos. Conventional cloud storage backup application may routinely backup this folder. Method 300 includes uploading, via a communication network to a network storage service, the portion of the media content stored in the digital camera image data structure (block 318). Method 300 includes purging media content that has remained in the cache data structure for more than a preset threshold period of time (block 320). Then method 300 ends.

With reference to FIG. 4, method 400 includes presenting, at a display, a user interface containing media content retrieved from the cache data structure and having a quality value that is less than the minimum quality threshold level and containing selectable options for saving or deleting the media content (block 402). In one or more embodiments, method 400 includes performing content (e.g., facial) recognition to identify content (e.g., one or more local faces) contained in media content (block 404). Method 400 includes determining whether a selection input is received indicating backup for the media content presented in the user interface (decision block 406). In response to receiving a selection input indicating backup for the media content presented in the user interface, method 400 includes storing the media content in the digital camera image data structure (block 408). Method 400 includes determining at least one of a first quality value of media content that is selected for backup (block 410). Method 400 includes adjusting a corresponding minimum quality threshold level to correspond to the first quality value (block 412). In an example, the minimum quality threshold level is stored in memory. In another example, the minimum quality threshold level is one of a plurality of minimum quality threshold levels respectively assigned to the one or more unique faces. In an additional example, the learning from subjective choices of a user may be augmented by, or overridden by, express control input settings made by the user to designate certain unique faces as favorites or faces to ignore. In one or more embodiments, the adjustments may reflect that the user generally chooses to save images of higher or lower quality regardless of the subject of the media content. In an example, the user may save images that are dark, or images where the subject is off center, etc. In one or more embodiments, the adjustments are specific to certain content (e.g., faces). In an example, media content containing the face of a child or close friend is always selected to be saved and backed up regardless of image or video quality. Media content containing the face of an acquaintance, or a co-worker is selected to be saved only when the quality of the image is high. Method 400 includes learning from the selections for saving and deleting specific images by looking for correlations with the content and particular quality characteristics of similarly stored content. In response to not receiving a selection input indicating backup for the media content presented in the user interface in decision block 406 or after block 412, method 400 includes determining whether a selection input is received indicating deletion for the media content presented in the user interface (decision block 414). In response to determining that no selection input is received indicating deletion for the media content presented in the user interface, method 400 ends. In response to receiving a selection input indicating deletion for the media content presented in the user interface, method 400 includes deleting the media content in the cache data structure (block 416). Method 400 includes determining at least one of a second quality value of media content that is selected for deletion (block 418). Method 400 includes adjusting the corresponding minimum quality threshold level to correspond to the second quality value (block 420). The minimum quality threshold level may be stored in memory. Method 400 learns from the deletions made by the user as to what the minimum quality threshold level should be. In one or more embodiments, each quality characteristic may have a different minimum quality threshold, or a combined weighted score may be derived from multiple quality characteristics. In one or more embodiments, different thresholds are determined for each unique content (e.g., face) identified in the media content. Then method 400 ends.

With reference to FIG. 5, method 500 provides for determining a quality value of each of multiple portions of video media content to enable identifying candidates for trimming poor quality initial or ending portions. In one or more embodiments, method 500 includes determining a first quality value of a beginning portion of the video media content (block 502). Method 500 includes determining a second quality value of a main portion of the video media content (block 504). Method 500 includes determining a third quality value of an ending portion of the video media content (block 506). Method 500 includes comparing each of the first, the second, and the third quality levels to a minimum quality threshold level (block 508). Method 500 includes determining whether the second quality value is greater than or equal to the minimum quality threshold level (decision block 510). In response to determining that the second quality value is not greater than or equal to (i.e., less than) the minimum quality threshold level, method 500 ends. In response to determining that the second quality value is greater than or equal to the minimum quality threshold level, then method 500 includes determining whether the first quality value is less than the minimum quality threshold level (decision block 512). In response to determining that the first quality value is less than the minimum quality threshold level, method 500 includes trimming the beginning portion from the video media content (block 514). In response to determining that the first quality value is not less than (i.e., equal to or greater than) the minimum quality threshold level in decision block 512 or after block 514, method includes determining whether the third quality value is less than the minimum quality threshold level (decision block 516). In response to determining that the third quality value is less than the minimum quality threshold level, method 500 includes trimming the ending portion from the video media content (block 518). In response to determining that the third quality value is not less than (i.e., equal to or greater than) the minimum quality threshold level in decision block 516 or after block 518, method ends.

Figure 6:
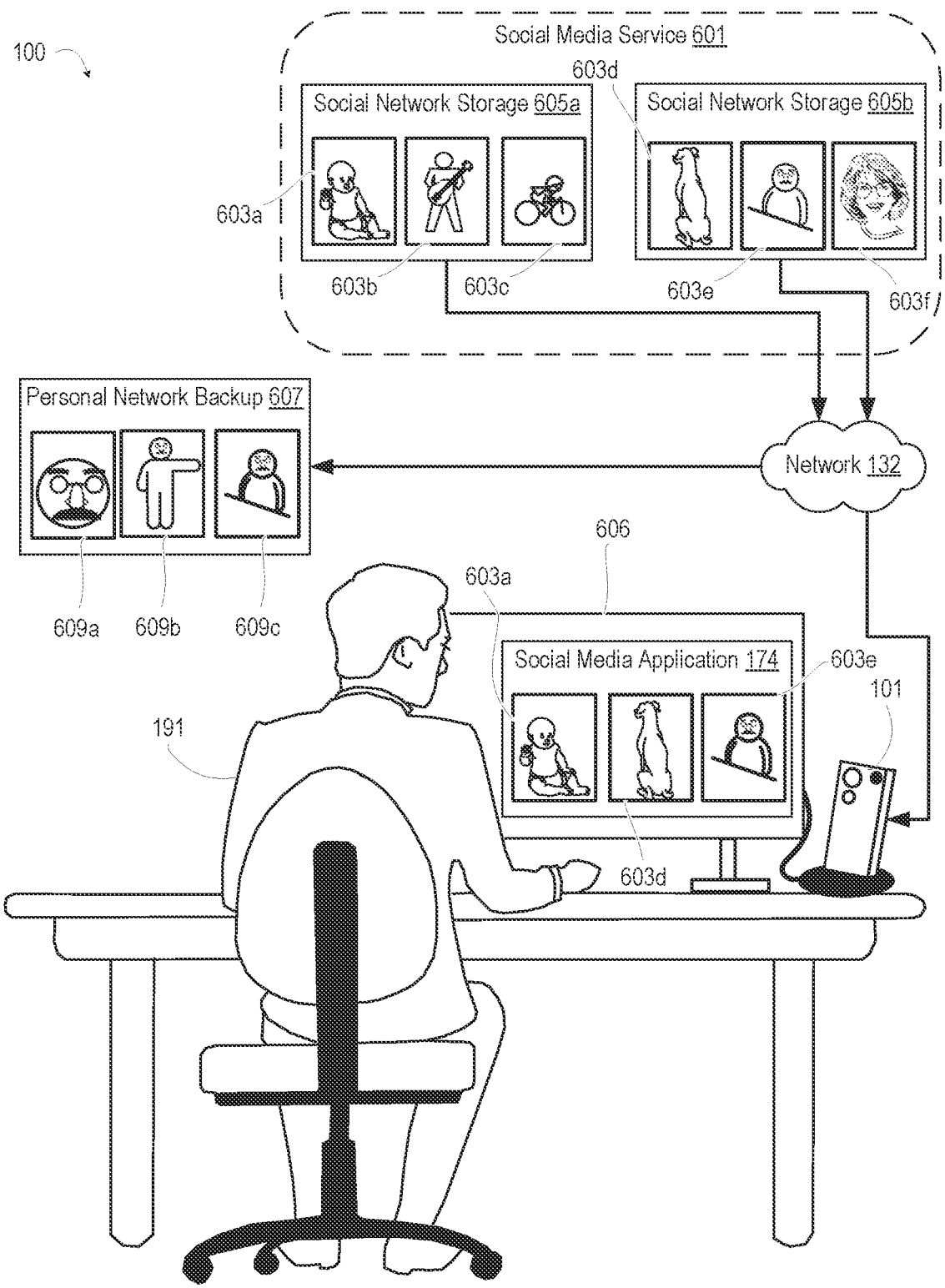
FIG. 6 depicts the communication environment with the communication device presenting, on a monitor, media content received from a social media service that is selectively aggregated for personal network backup, according to one or more embodiments.

FIG. 6 depicts communication environment 100 including communication device 101 having social media application 174 that retrieves, via communication network 132 and social media service 601, social media content 603*a* from first social network storage 605*a*, which stores second and third social media content 603*b*-603*c*. Communication device 101 retrieves fourth and fifth social media content 603*d*-603*e* from second social network storage 605*b*, which also stores sixth social media content 603*f*. Social media service 601 contains many images or videos (603*b*-603*c* and 603*f*) that may not be related to or associated with user 191. Communication device 101 presents, on monitor 606, first, fourth and fifth social media content 603*a*, 603*d*, and 603*e*. Of the universe of media content accessible to user 191 from social media service 601, a subset of social media content 603*a* and 603*d*-603*e* are either pushed to or pulled from social media service 601 for presenting at communication device 101. This subset of media content 603*a* and 603*d*-603*e* from social media service 601 may indicate some relationship to user 191. Local saving of social media content 603*a* and 603*d*-603*e* creates an opportunity for controller 106 (FIG. 1) of communication device 101 to identify and selectively aggregate media content for personal network backup. Communication device 101 is backing up first and second local media content 609*a*-609*b* on personal network backup 607. First and second local media content 609*a*-609*b* contain a same subject identified as a unique face as contained in fifth social media content 603*e*. By performing content (e.g., facial) recognition, communication device 101 identifies the association of the same face in first and second local media content 609*a*-609*b* and third local media content 603*c*. In response, communication device 101 aggregates fifth social media content 603*e* as third local media content 609*c* on personal network backup 607. Thus, certain (remote) social media content is identified as being associated with local media content that is being backed up and should be saved and backed up in a similar manner.

Figure 7A:
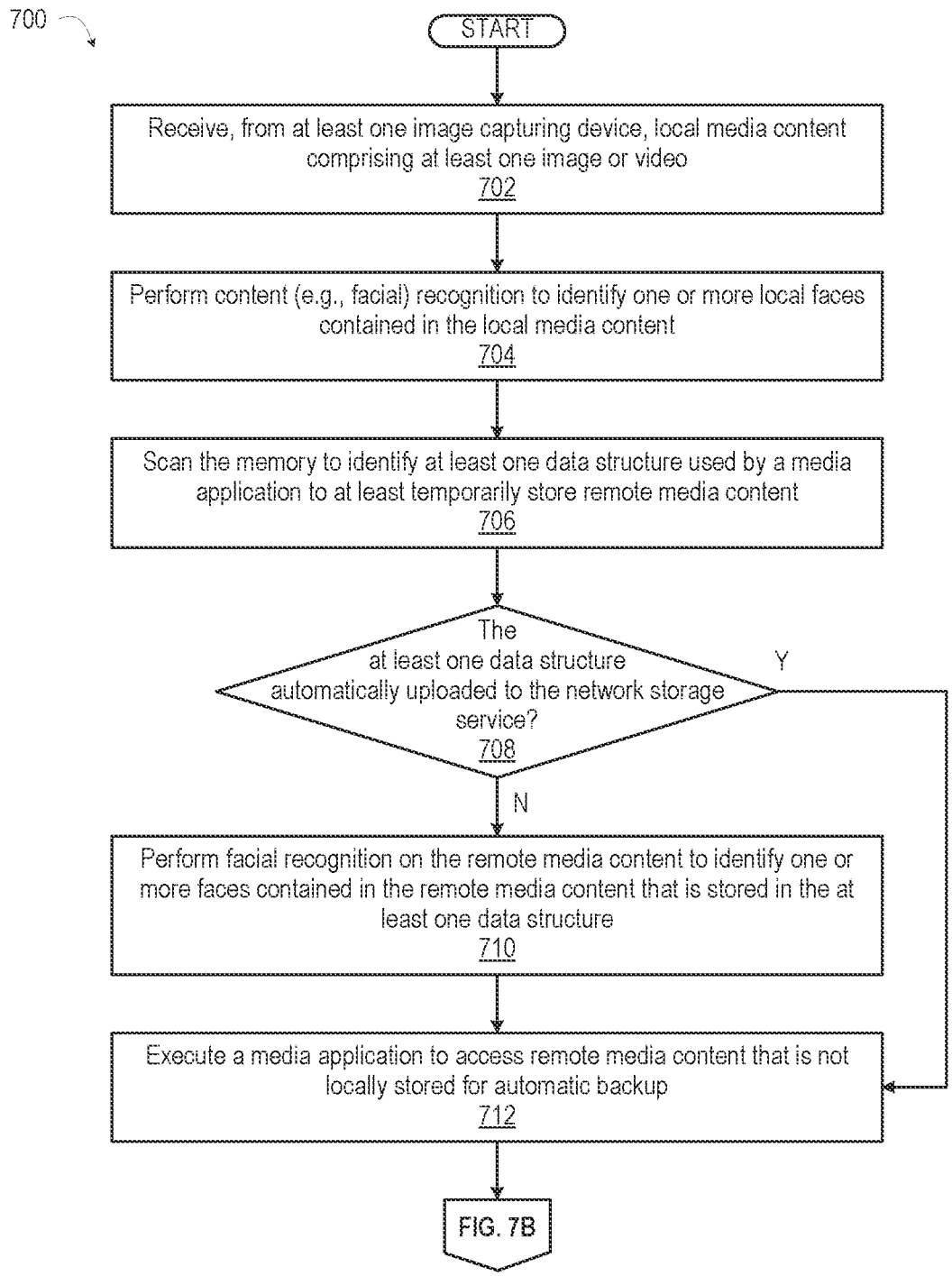
FIGS. 7A-7B (collectively "FIG. 7") are a flow diagram presenting an example method for aggregation of media content for personal network backup, according to one or more embodiments.
Figure 7B:
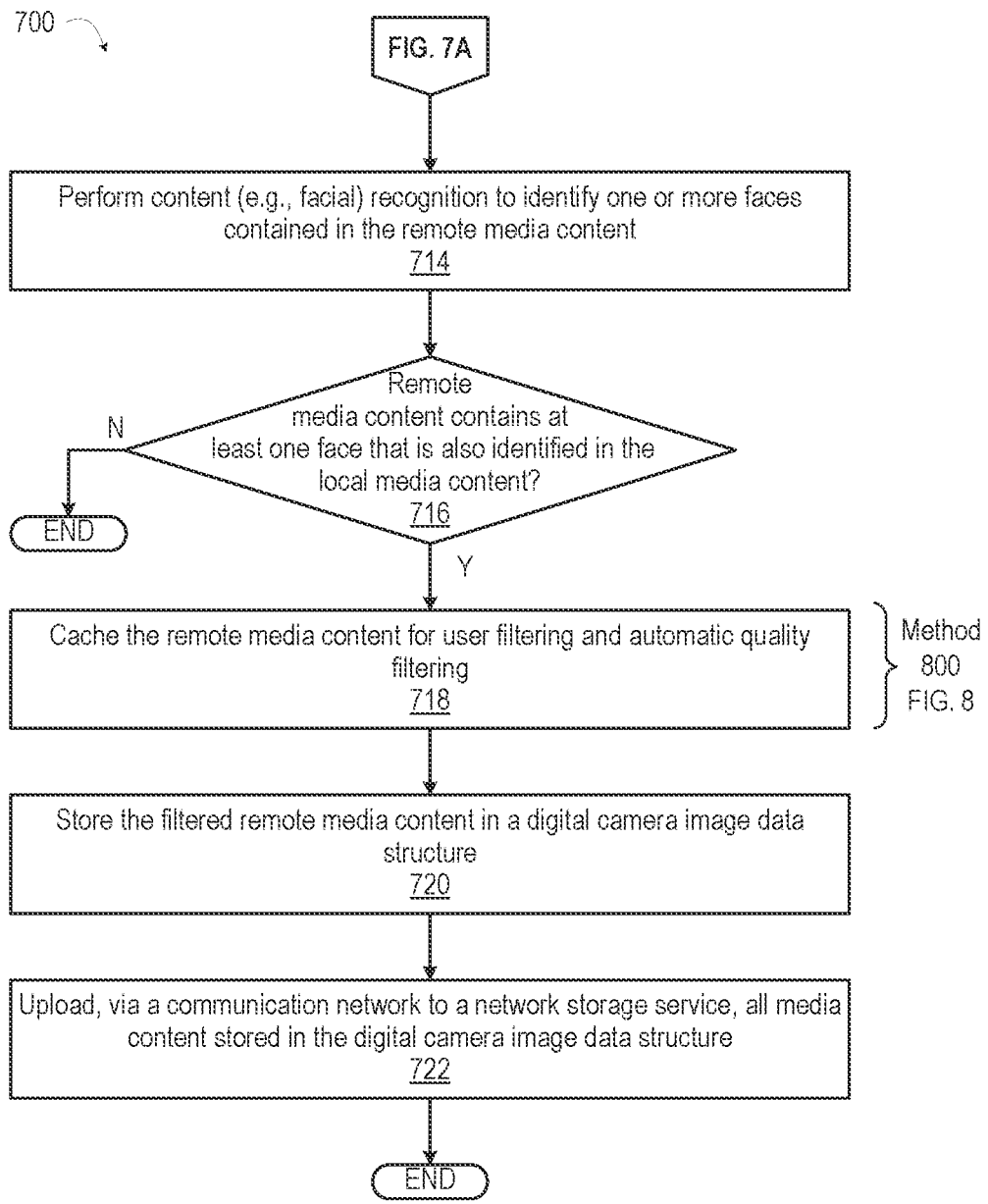
Figure 8:
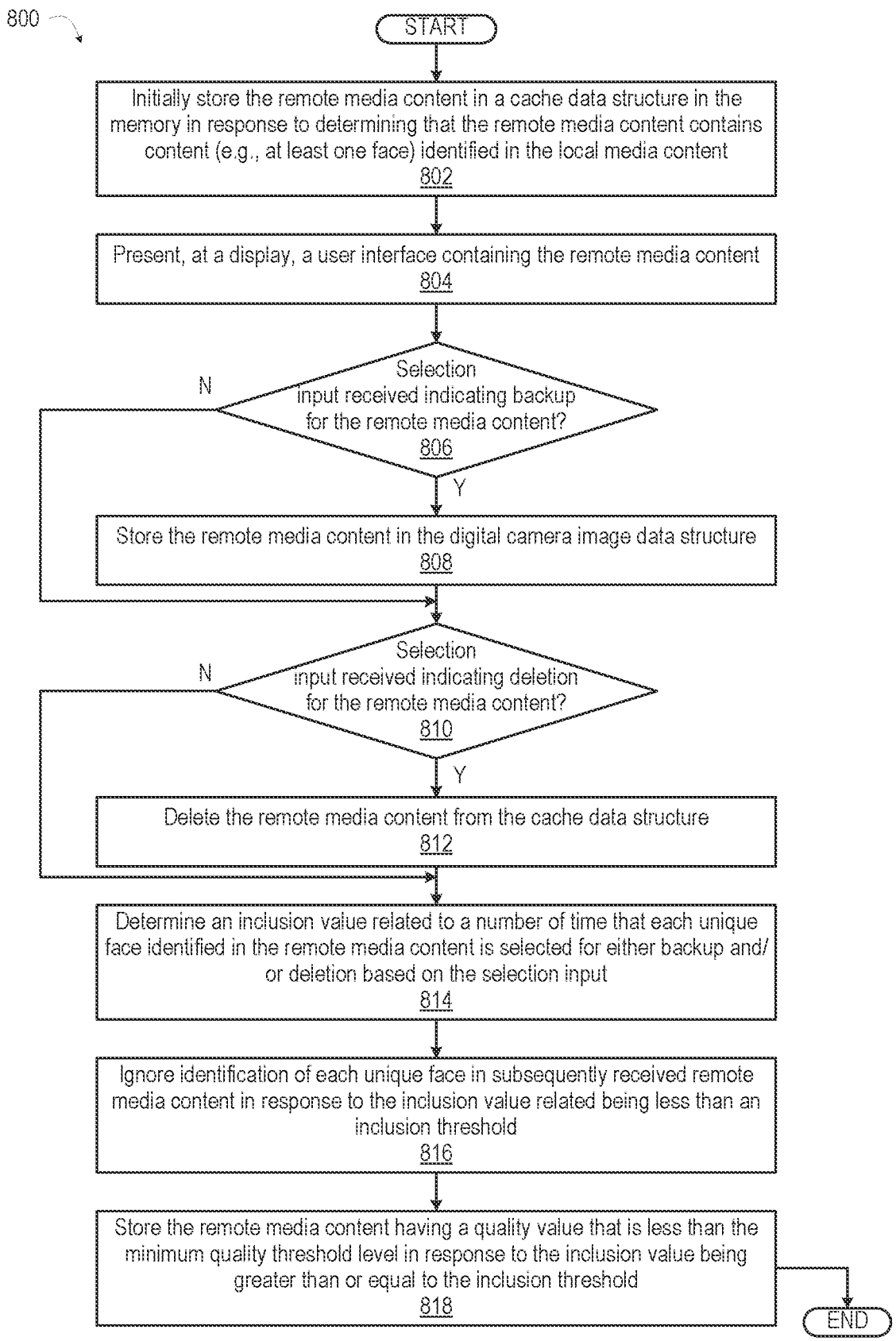
FIG. 8 depicts a flow diagram presenting an example method that implements a feature of FIG. 7 for user filtering and automatic quality filtering of cached aggregated media content, according to one or more embodiments.

FIGS. 7A-7B (collectively "FIG. 7") are a flow diagram presenting method 700 for aggregation of media content for personal network backup. FIG. 8 depicts a flow diagram presenting an example method that implements a feature of method 700 of FIG. 7 for user filtering and automatic quality filtering of cached aggregated media content. The description of method 700 (FIG. 7) and method 800 (FIG. 8) are provided with general reference to the specific components illustrated within the preceding FIGS. 1-2 and 6. Specific components referenced in method 700 (FIG. 7) and method 800 (FIG. 8) may be identical or similar to components of the same name used in describing preceding FIGS. 1-2 and 6. In one or more embodiments, controller 106 (FIG. 1) configures communication device 101 (FIGS. 1-2 and 6) to provide the described functionality of method 700 (FIG. 7) and method 800 (FIG. 8).

With reference to FIG. 7A, method 700 includes receiving, from at least one image capturing device, local media content comprising at least one image or video (block 702). In one or more embodiments, method 700 includes directly receiving the media content from the at least one image capturing device, intercepting the media content before being saved in DCI DS. In an example, aspects of the present disclosure may be integrated with applications that generate media content or that import media content from an external source such as an external ICD. Alternatively, or in addition, method 700 may include indirectly receiving media content from the at least one image capturing device. Method 700 may include identifying media content already saved in memory and not previously evaluated for quality filtering. Method 700 includes performing content (e.g., facial) recognition to identify content (e.g., one or more local faces) contained in the local media content (block 704). In an example, identification of content contained in the locally captured media content may be performed in real time as new media content is received or captured. In another example, identification of content contained in the locally captured media content may be performed via batch processing in non-real time after media content is received and stored in DCI DS. Method 700 includes learning content (e.g., unique faces) contained in local media content that is being backed up. Method 700 may include receiving content expressly specified by a user input that should be looked for in remote media content. With the content of interest identified, method 700 may include looking for the content of interest (e.g., unique faces) that should be looked for in remote media content in local memory storage that is not being saved and backed up. In an example, method 700 may include scanning content that is already locally saved but is not being backed up.

With continued reference to FIG. 7A, in one or more embodiments, method 700 includes scanning the memory to identify at least one data structure used by a media application to at least temporarily store remote media content received at communication device (block 706). Method 700 includes determining whether the at least one data structure is automatically uploaded to the network storage service (decision block 708). This determination is performed because subsequently performing content recognition is unnecessary if the remote media content is already being backed up. In response to determining that the at least one data structure is not automatically uploaded to the network storage service, method 700 includes performing content (e.g., facial) recognition on the remote media content to identify one or more faces contained in the remote media content that is stored in the at least one data structure (block 710). The locally-saved remote media content has been analyzed at this point for further processing as described below with reference to FIG. 7B. Alternatively, or in addition, the processes of method 700 may be integrated with application(s) such as social media applications, communication applications, display managers, etc., to detect retrieval or presentation of images or video that can be analyzed for content (e.g., facial) recognition. In response to determining that the at least one data structure is automatically uploaded to the network storage service in decision block 708 or after block 710, method 700 includes monitoring execution of a media application that accesses remote media content that are not locally stored for automatic backup (block 712). The monitoring may be real-time, identifying remote media content that is presented on an output device or that is temporarily stored to support presentation. The monitoring may be non-real time, scanning files after presentation stored in memory by the media application. Then method 700 proceeds to block 714 of FIG. 7B.

With reference to FIG. 7B, method 700 includes performing facial recognition to identify one or more faces contained in the remote media content (block 714). Method 700 includes determining whether remote media content contains content (e.g., object or content or interest, such as at least one face) that is also identified in the local media content (decision block 716). In response to determining that remote media content does not contain at least one face or object/content of interest that is also identified in the local media content, method 700 ends. In response to determining that remote media content contains at least one face that is also identified in the local media content, method 700 includes caching the remote media content for user filtering/selection and/or automatic quality filtering (block 718). An example of implementing block 718 is provided below in method 800 (FIG. 8). Method 700 includes storing the remote media content in a digital camera image data structure in memory (block 720). Method 700 includes uploading, via a communication network to a network storage service, all media content stored in the digital camera image data structure (block 722). Then method 700 ends.

With reference to FIG. 8, method 800 includes initially storing a copy of the remote media content in a cache data structure in the memory in response to determining that the remote media content contains at least one face identified in the local media content (block 802). Method 800 includes presenting, at a display, a user interface containing the remote media content and selectable options to backup (or delete) the copy of the remote media content (block 804). Method 800 includes determining whether a selection input indicating backup for the remote media content is received (decision block 806). In response to receiving a selection input indicating backup for the remote media content, method 800 includes storing the remote media content in the digital camera image data structure (block 808). In response to not receiving a selection input indicating backup for the remote media content in decision block 806 or after block 808, method 800 includes determining whether a selection input is received indicating deletion for remote media content (decision block 810). In response to receiving a selection input indicating deletion for remote media content, method 800 includes deleting the remote media content from the cache data structure (block 812). In response to not receiving a selection input indicating deletion for the remote media content in decision block 810 or after block 812, method 800 includes monitoring a number of times that each unique face identified in the remote media content is selected for either backup or deletion based on the selection input (block 814). Method 800 includes determining a value related to whether or not specific content is a favorite or not. In an example, method 800 includes determining a first value of the number of times the specific content is selected for saving and a second value of the number of times the content is selected for deletion (block 816). In an example, method 800 includes ignoring identification of each unique face in subsequently received remote media content in response to an inclusion threshold of the first value to the second value of selected backup to deletion of the specific content being less than an inclusion threshold ratio (block 816). In an example, unique content such as a face has to receive a minimum number of selections (e.g., 1, 5, or 10) before the number of user selection(s) is used to adjust behavior of the system implementing method 800. In another example, a strong positive or negative correlation of user selections has to be detected before adjusting the behavior of the system implementing method 800. In an example, a strong positive correlation may be 7 out of 10 or higher and a strong negative correlation may be 3 out of 10 or lower. These positive or negative correlations may be evaluated as a favorite threshold as a comparison of selections to save versus opportunities to select. The favorite threshold may be evaluated as a comparison of selections to delete to opportunities to select to delete. The favorite threshold may be evaluated as a comparison of selection to save versus selections to delete. In a further example, a favorite threshold may be evaluated as a weighted value of as a comparison of selection to save versus selections to delete adjusted with a confidence factor. The confidence factor may be based on the number of selections and the number of opportunities to select. Method 800 includes storing, in DCI DS, the remote media content having a quality value that is less than the minimum quality threshold level in response to the inclusion value being greater than or equal to an inclusion threshold (block 818). Then method 800 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
at least one image capturing device that generates local media content comprising at least one image or video;
a memory that stores a media application that accesses remote media content comprising at least one image or video, a content recognition module, and a digital camera image data structure;
a communication subsystem communicatively connectable to a communication network; and
a controller communicatively connected to the at least one image capturing device, the memory, and the communication subsystem, and which:
receives the local media content from the at least one image capturing device;
performs content recognition, using the content recognition module, to identify one or more local objects contained in the local media content;
monitors execution of the media application that accesses the remote media content;
performs content recognition on the remote media content to identify one or more objects contained in the remote media content; and
in response to determining that remote media content contains at least one object that is also identified in the local media content, stores the remote media content in the digital camera image data structure.

2. The electronic device of claim 1, wherein the controller:
in response to determining that the remote media content contains at least one object identified in the local media content:
initially stores the remote media content in a cache data structure in the memory;
presents, at a display, a user interface containing the remote media content;
in response to receiving a selection input indicating backup for remote media content, copies the remote media content from the cache data structure to the digital camera image data structure; and
in response to receiving a selection input indicating deletion for remote media content, deletes the remote media content from the cache data structure.

3. The electronic device of claim 2, wherein the controller:
monitors, based on the selection input, a number of times that each unique object identified in the remote media content is selected for either backup or deletion; and
ignores identification of each unique object in subsequently received remote media content in response to a value related to selections for backup versus deletion being less than an inclusion threshold.

4. The electronic device of claim 1, wherein the controller:
determines a quality value of the remote media content; and
stores the remote media content in the digital camera image data structure based in part on the remote media content having a quality value that is greater than or equal to a minimum quality threshold level.

5. The electronic device of claim 4, wherein the controller:
monitors, based on a selection input, a number of times that each unique object identified in the remote media content is selected for either backup or deletion; and
stores the remote media content having a quality value that is less than the minimum quality threshold level in response to a value related to selection for backup versus deletion being greater than or equal to an inclusion threshold.

6. The electronic device of claim 1, wherein the controller:
scans the memory to identify at least one data structure used by the media application to at least temporarily store the remote media content; and
in response to determining that the at least one data structure is not automatically uploaded to the network storage service, performs content recognition, using the content recognition module, to identify one or more objects contained in the remote media content stored in the at least one data structure.

7. The electronic device of claim 1, wherein the content recognition module identifies unique faces as the one or more objects.

8. The electronic device of claim 1, wherein the memory stores a client cloud storage application, and the controller:
executes the client cloud storage application to upload, via the communication subsystem to a network storage service, the local media content stored in the digital camera image data structure and the copy of the remote media content.

9. A method comprising:
receiving, from at least one image capturing device, local media content comprising at least one image or video;
performing content recognition to identify one or more local objects contained in the local media content;
monitoring execution of a media application that accesses remote media content;
performing content recognition on the remote media content to identify one or more objects contained in the remote media content; and
in response to determining that remote media content contains at least one object that is also identified in the local media content, stores the remote media content in a digital camera image data structure in memory.

10. The method of claim 9, further comprising:
in response to determining that the remote media content contains at least one object identified in the local media content:
initially storing the remote media content in a cache data structure in the memory;
presenting, at a display, a user interface containing the remote media content;
in response to receiving a selection input indicating backup for the remote media content, storing the remote media content in the digital camera image data structure; and
in response to receiving a selection input indicating deletion for remote media content, deleting the remote media content from the cache data structure.

11. The method of claim 10, further comprising:
monitoring, based on the selection input, a number of times that each unique object identified in the remote media content is selected for either backup or deletion; and ignoring identification of each unique object in subsequently received remote media content in response to a value related to selection for backup versus deletion being less than an inclusion threshold.

12. The method of claim 10, further comprising:
determining a quality value of the remote media content; and
storing the remote media content in the digital camera image data structure based in part on the remote media content having a quality value that is greater than or equal to a minimum quality threshold level.

13. The method of claim 12, further comprising:
monitoring, based on the selection input, a number of times that each unique object identified in the remote media content is selected for either backup or deletion; and
storing the remote media content having a quality value that is less than the minimum quality threshold level in response to a value related to selection for backup versus deletion being greater than or equal to an inclusion threshold.

14. The method of claim 9, further comprising:
scanning the memory to identify at least one data structure used by the media application to at least temporarily store the remote media content; and
in response to determining that the at least one data structure is not automatically uploaded to the network storage service, performing content recognition to identify one or more objects contained in the remote media content stored in the at least one data structure.

15. The method of claim 9, further comprising performing content recognition on the local and the remote media content to identify unique faces as the one or more objects.

16. The method of claim 9, further comprising:
uploading, to a network storage service, the local media content stored in the digital camera image data structure and the copy of the remote media content.

17. A computer program product comprising:
a computer readable storage device; and
program code on the computer readable storage device that when executed by a processor associated with an electronic device, the program code enables the electronic device to provide functionality of:
receiving, from at least one image capturing device, local media content comprising at least one image or video;
performing content recognition to identify one or more local objects contained in the local media content;
monitoring execution of a media application that accesses remote media content;
performing content recognition on the remote media content to identify one or more objects contained in the remote media content; and
in response to determining that remote media content contains at least one object that is also identified in the local media content, stores the remote media content in a digital camera image data structure in memory.

18. The computer program product of claim 17 wherein the program code enables the electronic device to provide functionality of:
in response to determining that the remote media content contains at least one object identified in the local media content:
initially storing the remote media content in a cache data structure in the memory;
presenting, at a display, a user interface containing the remote media content;
in response to receiving a selection input indicating backup for the remote media content, storing the remote media content in the digital camera image data structure; and
in response to receiving a selection input indicating deletion for remote media content, deleting the remote media content from the cache data structure.

19. The computer program product of claim 18 wherein the program code enables the electronic device to provide functionality of:
monitoring, based on the selection input, a number of times that each unique object identified in the remote media content is selected for either backup or deletion; and
ignoring identification of each unique object in subsequently received remote media content in response to a ratio of selected backup to deletion being less than an inclusion threshold ratio.

20. The computer program product of claim 18 wherein the program code enables the electronic device to provide functionality of:
uploading, to a network storage service, the local media content stored in the digital camera image data structure and the copy of the remote media content.

* * * * *